United States Patent [19]

Lichtmann

[11] Patent Number: 5,112,098

[45] Date of Patent: May 12, 1992

[54] ANTI-THEFT VEHICLE COVER FOR TRANSPORT AND STORAGE

[76] Inventor: Robert S. Lichtmann, 20675 Nordhoff St., Chatsworth, Calif. 91311

[21] Appl. No.: 532,376

[22] Filed: Jun. 4, 1990

[51] Int. Cl.⁵ .............................................. B60J 11/00
[52] U.S. Cl. .................................................... 296/136
[58] Field of Search ................ 296/136, 95.1; 150/166

[56] References Cited

U.S. PATENT DOCUMENTS

| | | | |
|---|---|---|---|
| 2,243,981 | 11/1939 | Rowan | 296/136 |
| 2,623,481 | 12/1952 | Muciaccia et al. | 296/136 |
| 2,688,513 | 9/1954 | Poirier | 296/98 |
| 2,733,747 | 2/1956 | Altschul | 150/52 |
| 4,294,483 | 10/1981 | Ferris | 296/136 |
| 4,355,839 | 10/1982 | Rosen | 296/136 |
| 4,589,459 | 5/1986 | Lantrip | 296/136 |
| 4,612,967 | 9/1986 | Kamen et al. | 150/52 |
| 4,795,207 | 1/1989 | Clarke | 296/136 |
| 4,938,522 | 7/1990 | Herron et al. | 296/136 |

OTHER PUBLICATIONS

1983 Covercraft Sales Catalog, p. 1.
1985 Covercraft Sales Catalog.
1986 Covercraft Sales Catalog, pp. 2–4.
1985-1986 B&E Enterprises Sales Catalog, p. 17.

Primary Examiner—Robert R. Song

[57] ABSTRACT

In a vehicle cover having a body member for forming a skin over the vehicle excepting at least one door thereof, the skin defining openings for a radiator grill and a pair of headlights, the skin also including at least one windshield flap for selectively exposing a portion of a windshield of the vehicle; the vehicle cover further including means for selectively anchoring the vehicle cover to the vehicle and for preventing the vehicle cover from being easily removed.

12 Claims, 4 Drawing Sheets

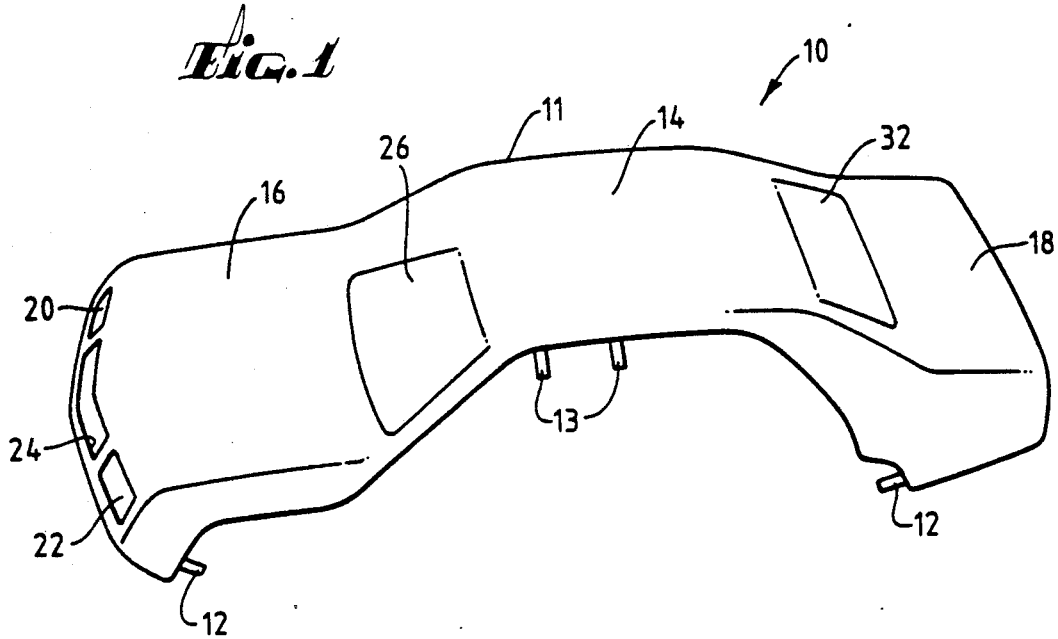
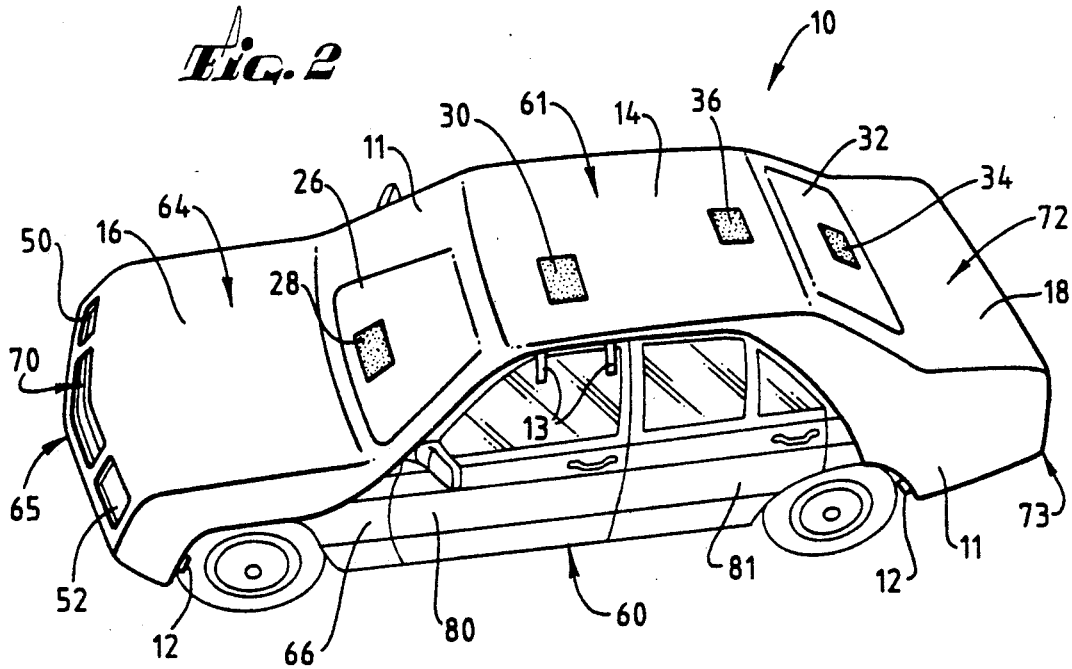

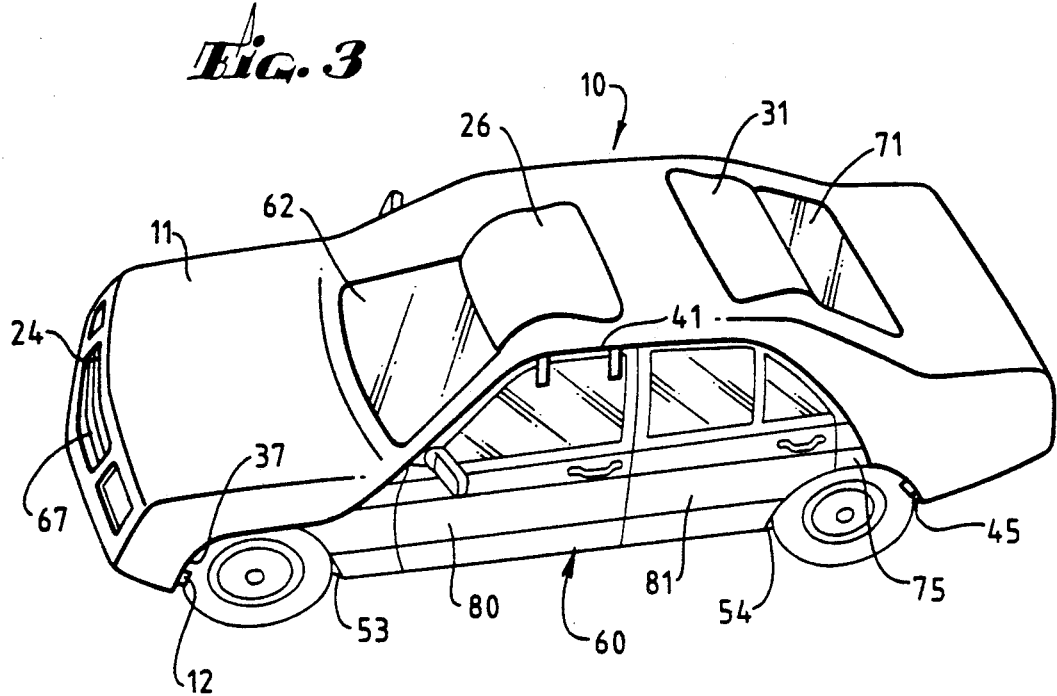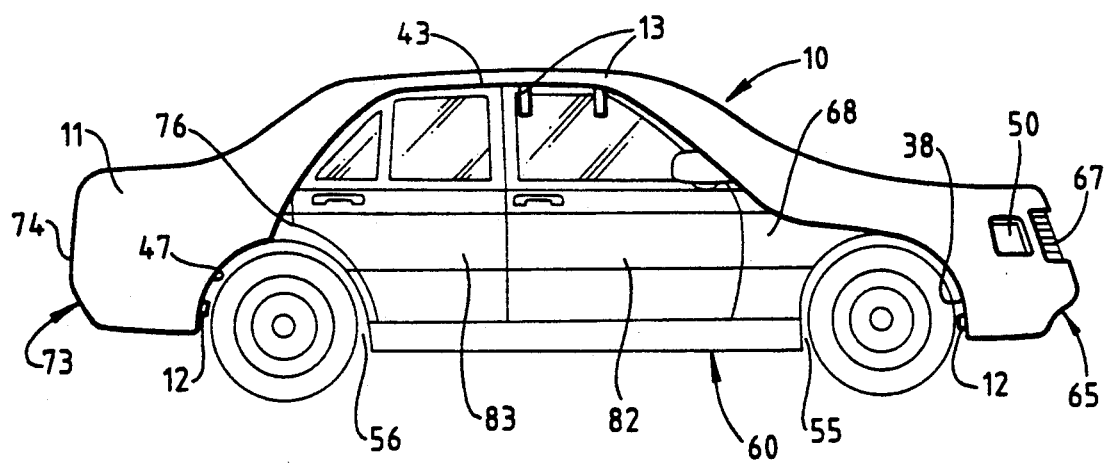

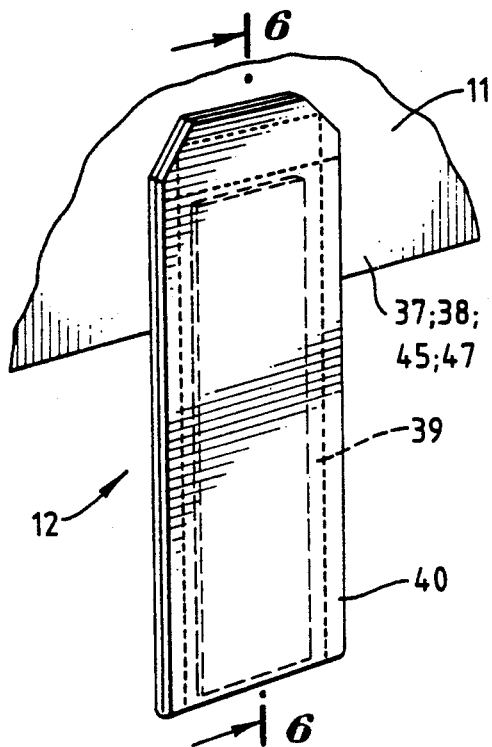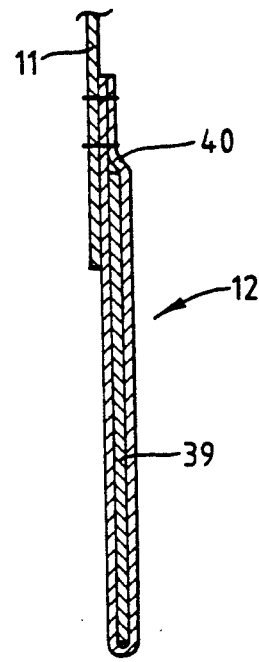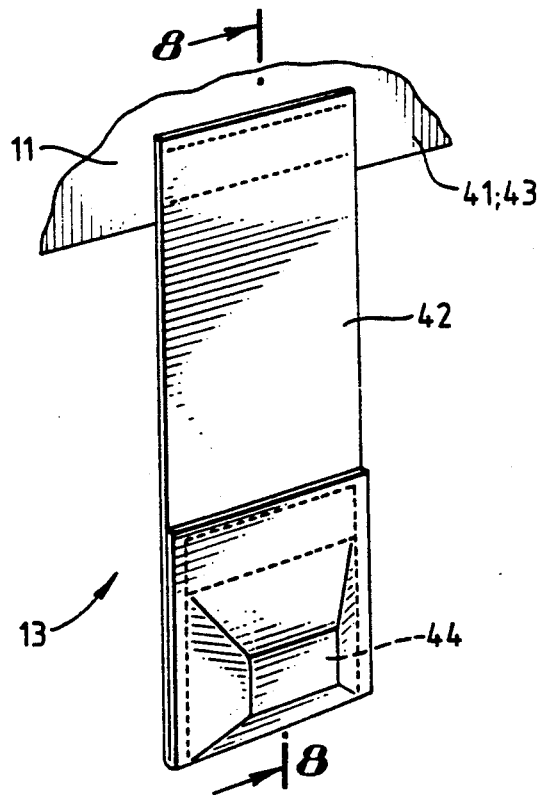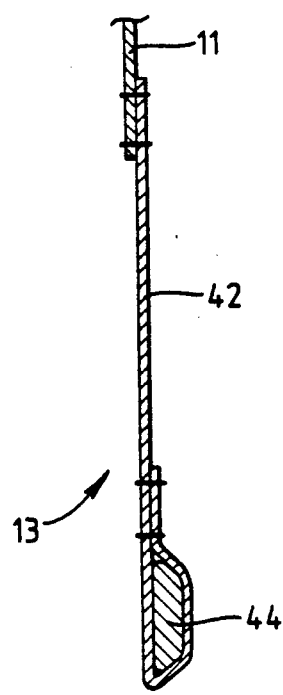

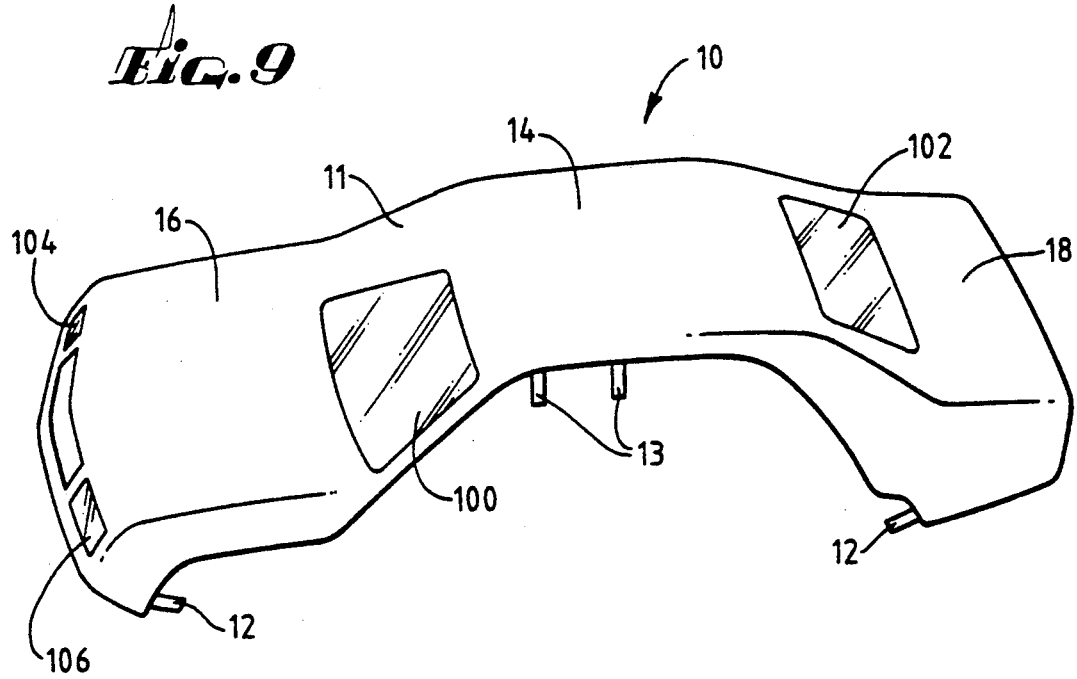

ANTI-THEFT VEHICLE COVER FOR TRANSPORT AND STORAGE

BACKGROUND OF THE INVENTION

1. Field of the Invention

This invention relates to vehicle covers and, more specifically, to a vehicle cover which is designed to protect a substantial portion of the body finish of a vehicle from pollutants and which is quickly locked into position. In addition, the cover has openings which permit the vehicle to be accessed through its doors and driven limited distances.

2. Description of the Prior Art

Many vehicle covers are known for protecting cars and trucks from the harmful effects of weather, pollution, and vandalism. These vehicle covers may also address problems of preventing the theft of the vehicle cover itself. None of these prior vehicle covers, however, are very efficient at protecting a vehicle while at the same time allowing the covered vehicle to be driven limited distances during the shipping and temporary storage of the vehicle. This inefficiency is greatly magnified when a large number of vehicles need not only to be covered, but also driven and handled during commercial shipping. Many prior vehicle covers are inefficient for commercial purposes in that:

they do not provide immediate access to the interior of a vehicle through its doors;

they do not allow a vehicle to be safely and properly driven while covered; and they do not provide a quick and efficient means for locking the cover on the vehicle, without additional locks and keys not part of the vehicle, to prevent the easy theft of the vehicle cover.

U.S. Pat. No. 4,294,483 to Ferris discloses an inflatable vehicle cover used for protecting automobiles that are in railway transit from the factory against acts of vandalism, such as the throwing of rocks or other objects at the vehicles. The inflatable vehicle cover comprises at least one inflatable cell of flexible air-confining material that substantially conforms to the configuration of the vehicle it is to cover. The deflated cover is placed over the vehicle in such manner that all exterior surfaces of the vehicle are covered. The cover is then secured about the vehicle by either an elasticized circumference or perimeter-engaging straps. The cover is then inflated prior to transit. Upon arrival of the vehicle at its destination, the cover is deflated and removed.

While the vehicle cover disclosed in the Ferris patent protects a car from weather and pollution, it does not provide for access to a vehicle's interior, nor does it permit the car to be driven while covered.

U.S. Pat. No. 2,243,981 to Rowan discloses an automobile cover especially adapted for protecting an automobile from weather conditions such as rain, snow, dew and moisture from large bodies of water. The cover principally consists of side panels, front and rear panels, and a top panel. The lower edges of the side, front and rear panels are provided with hems to receive elastic strips to bring about a tight fit around the lower edges of the cover about the automobile. The front, rear and side panels have slots which open outwardly through the lower edges of the panels and are normally closed by zippers. These slots will permit opening of the cover while on the automobile to give entrance and exit to the body of the automobile. The front panel has a substantially U-shaped slot which forms in the panel a flap directly in front of the windshield of the automobile. This slot may be folded downwardly to expose the glass of the windshield thereby permitting an occupant to readily see through the windshield for the purpose of driving the automobile for a limited distance while shrouded. The front panel also has openings which allow the light from the headlights to shine through the cover.

The zippered slots of the Rowan cover which provide for access to the interior of the automobile tend to flap in the wind and damage the sides of the car when driven. In addition, the side panels of the Rowan cover can become tangled with the wheels while the car is moving, or when the front wheels are turned from side to side. Further, the Rowan cover is not equipped with a mechanism to prevent its U-shaped slot from inadvertently covering the exposed windshield while the car is being driven. Also, Rowan does not disclose a mechanism to prevent the theft of the automobile cover.

U.S. Pat. No. 2,688,513 to Poirier discloses a power operated vehicle cover comprising a pliable sheet having a central strip which is adapted to extend from the front bumper over the top of the vehicle to the rear bumper. A pair of side panels extend down the sides of the vehicle and are releasably fastened to the sides of the vehicle by a conventional form of spring fasteners. Slide fastener controlled openings are positioned upon the side panels to register with the doors of the vehicle to thereby provide a ready means for obtaining access to the interior of the vehicle without the necessity of removing the protective covering therefrom. Poirier also discloses a key-lock controlled bolt for securely locking the front end of the cover to the front bumper of the vehicle.

While the Poirier cover does allow for access to the interior of a vehicle, it does not include the necessary openings which permit the vehicle to be operated in a safe and proper manner. Moreover, the locking mechanism of Poirier does not allow the cover to be locked onto the car quickly without using an additional key or combination lock not part of the standard equipment of the car.

Although these and other similar prior devices all represent contributions to the art, none are suitable for simultaneously:

protecting a substantial portion of the body finish of a vehicle from the effects of acid rain and other pollutants;

allowing immediate access to the interior of a covered vehicle through its doors;

permitting the vehicle to be driven safely and properly for limited distances; and locking the cover in a quick and efficient manner to the vehicle and to prevent the easy theft of the cover.

It is therefore an object of the present invention to provide a vehicle cover which is suitable for protecting the body finish of a vehicle against the effects of acid rain and other harmful pollutants.

Yet another object of the present invention is to provide a vehicle cover which allows for the immediate access to the interior of the vehicle through its doors.

It is another object of the present invention to provide a vehicle cover having means and openings which allow the covered vehicle to be operated in a safe and proper manner.

It is yet another object of the present invention to provide a vehicle cover which can be quickly and efficiently locked to the vehicle that it covers, without additional locks and keys not included as standard equipment with the vehicle, to prevent the easy theft of the cover.

It is still another object of the present invention to provide a combination of the foregoing elements in a device which is inexpensive to fabricate.

SUMMARY OF THE INVENTION

These objects and others, are achieved by the provision of the anti-theft vehicle cover for transport and storage of the present invention. The anti-theft vehicle cover comprises a body member for forming a skin over the vehicle excepting at least one door thereof, the skin defining openings for a radiator grill and a pair of headlights, the skin also including at least one windshield flap for selectively exposing a portion of a windshield of the vehicle; the vehicle cover further including means for selectively anchoring the vehicle cover to the vehicle and for preventing the vehicle cover from being easily removed.

A better understanding of the invention, its uses and its other objects and advantages, may be obtained from a consideration of the following detailed description of the preferred embodiments, particularly when read in conjunction with the appended drawings, a brief description of which now follows.

BRIEF DESCRIPTION OF THE DRAWINGS

FIG. 1 is a perspective view of one embodiment of the anti-theft vehicle cover of the present invention.

FIG. 2 is a perspective view of another embodiment of the anti-theft vehicle cover of the present invention fitted on a vehicle;

FIG. 3 is a perspective view of the anti-theft vehicle cover of the present invention with its windshield flaps in the folded position exposing the windshields of the vehicle which it covers;

FIG. 4 is a side view of the anti-theft vehicle cover of the present invention fitted on a vehicle;

FIG. 5 is a perspective view of a bendable tab of the vehicle cover of the present invention;

FIG. 6 is a cross-sectional side view along line 6—6 of FIG. 5 of a bendable tab of the vehicle cover of the present invention;

FIG. 7 is a perspective view of an anti-theft tab of the vehicle cover of the present invention;

FIG. 8 is a cross-sectional side view along line 8—8 of FIG. 7 of an anti-theft tab of the vehicle cover of the present invention.

FIG. 9 is a perspective view of another embodiment of the anti-theft vehicle cover of the present invention.

DETAILED DESCRIPTION OF THE PREFERRED EMBODIMENT

As can be seen by reference to the drawings, the vehicle cover that forms the basis of the present invention is designated generally by the reference numeral 10. Vehicle cover 10 comprises a body member 11 that forms a skin of fabric over a large portion of the surface area of vehicle 60; a plurality of bendable tabs 12 disposed on body member 11 at various points to secure vehicle cover 10 to vehicle 60; and a plurality of theft guard tabs 13 disposed on body member 11 at various points which can be inserted into any of doors 80, 81, 82 or 83 of vehicle 60 to effectively prevent the easy theft of vehicle 60 when doors 80, 81, 82 or 83 are closed and locked.

FIG. 1 shows vehicle cover 10 standing alone, while FIG. 2 shows vehicle cover 10 fitted over vehicle 60. Body member 11 comprises a roof section 14, a hood section 16, and a trunk section 18. Roof section 14 covers the entire roof 61 of vehicle 60. Hood section 16 covers substantially the entire upper surface of vehicle 60 forward of roof 61 including front windshield 62, hood 64, front bumper 65, parts of front fenders 66 and 68, and part of front grill 70. Trunk section 18 covers substantially the entire upper surface of vehicle 60 rearward of roof 61 including rear windshield 71, trunk 72, rear bumper 73, tail 74 and parts of rear fenders 75 and 76.

As is shown in FIGS. 1-4, doors 80, 81, 82 and 83 of vehicle 60 are not covered by cover 10. The purpose of not covering the doors is to provide immediate access to the interior of vehicle 60 while vehicle cover 10 is fitted thereon. Additionally, omitting side panels from the design of vehicle cover 10 avoids the possibility that such side panels could become tangled with the wheels of the vehicle while they are rolling or being turned.

Front windshield flap 26 is cut out of hood section 16. When front windshield flap 26 is folded back onto body member 11 of vehicle cover 10, front windshield 62, or a portion thereof, is exposed. In this manner, vehicle 60 can be driven limited distances, on or off transport carriers, or around storage lots. FIG. 3 shows front windshield flap 26 folded back upon roof section 14 of vehicle cover 10. While not shown in the drawings, the present invention encompasses a vehicle cover 10 having a front windshield flap 26 which can be folded forward onto hood section 16.

Rear windshield flap 32 is out into trunk section 18 of vehicle cover 10. As is also shown in FIG. 3, rear windshield flap 32 can be folded forward upon roof section 14 of vehicle cover 10 thereby exposing rear windshield 71 or a portion thereof. With rear windshield flap 32 folded forward, the driver of vehicle 60 can see through rear windshield 71, and drive vehicle 60. Again, even though FIG. 3 shows rear windshield flap 32 folded forward, the present invention encompasses a rear windshield flap 32 capable of being folded back upon trunk section 18 of vehicle cover 10.

Additionally, as shown in FIG. 2, vehicle cover 10 may be provided with means for securing front and rear windshield flaps 26 and 32 in their folded positions. Such securing means will prevent the inadvertent covering of either the front or rear windshield, 62 or 71 respectively, while vehicle 60 is being driven.

Such securing means may include any of a variety of conventional fasteners. A preferred fastener to be used in conjunction with vehicle cover 10 is a Velcro ® closure. A front sheet 20 of the hook tape component of a Velcro ® closure is disposed on front windshield flap 26. A front roof sheet 30 of the loop tape with pile component of a Velcro ® closure is disposed on the roof section 14 of vehicle cover 10. The front roof sheet 30 is positioned such that when front windshield flap 26 is folded back, front sheet 28 mates with front roof sheet 30 and secures front windshield flap 26 in its folded position. Both front sheet 28 and front roof sheet 30 should be of a sufficient area to effect a strong enough closure to hold front windshield flap 26 in the folded position, and to allow the mating or fastening process to be accomplished quickly and without tediousness.

Likewise, a back sheet 34 of the hook tape component of a Velcro ® closure is disposed on rear windshield flap 32. A back roof sheet 36 of the loop tape with pile component of a Velcro ® closure is disposed on the roof section 14 of vehicle cover 10. Again, the back roof sheet 36 is positioned such that when back or rear windshield flap 32 is folded forward, back sheet 34 mates with back roof sheet 36 and secures rear windshield flap 32 in its folded position.

In addition to the front and rear windshield flaps 26 and 32, vehicle cover 10 has other features which allow vehicle 60 to be operated. Radiator grill opening 24 is cut out of hood section 16 to expose the radiator grill 67. Exposing radiator grill 67 allows air to flow therethrough and properly ventilate the radiator (not shown) of vehicle 60. Likewise, front headlight openings 20 and 22 are cut out of hood section 16 to expose the front headlights 50 and 52 to allow their light rays to shine through cover 10. Although not shown in the drawings, similar openings may be cut into trunk section 18 to expose the taillights (not shown) of vehicle 60.

Another embodiment of vehicle cover 10 is shown in FIG. 9. Instead of having flaps, panels of transparent material are sewn into vehicle cover 10 to allow light to pass through at various points so that vehicle 60 can be driven safely for limited distances. For example, front windshield panel 100 is sewn into hood section 16 to expose the front Windshield. Likewise, back windshield panel 102 is sewn into trunk section 18 to expose the rear windshield. In addition, headlight panels 104 and 106 may be sewn into hood section 16. Similarly, taillight panels (not shown) may be sewn into trunk section 18. Preferably, these panels are made of any suitable transparent plastic which can be sewn or otherwise attached to vehicle cover 10.

A plurality of bendable tabs 12 anchor vehicle cover 10 onto vehicle 60. As shown in FIGS. 5 and 6, bendable tabs 12 comprise a bendable insert 39 covered by a non-scratching fabric 40. Bendable insert 39 may be made out of any sufficiently bendable shape retaining material. Preferably, bendable insert 39 is made out of aluminum sheet.

The tabs 12 are disposed on the body member 11, preferably on hood section 16 and trunk section 18. To secure the front half of cover 10, bendable tabs 12 are stitched or otherwise attached to edges 37 and 38 of the areas of hood section 16 that cover front fenders 66 and 68. Similarly, to secure the back of cover 10, bendable tabs 12 are stitched or otherwise attached to edges 45 and 47 of the areas of trunk section 18 that cover rear fenders 75 and 76. Tabs 12 are bent around the edges of and inside wheel wells 53, 54, 55 and 56 of vehicle 60 to anchor vehicle cover 10 in place and to allow for a more tailored fit around such wheel wells so that the vehicle may be safely driven.

A plurality of theft guard tabs 13 are disposed on roof section 14 near the sides thereof. Each theft guard 13 comprises an elongated fabric strap 42 and a bulbous inner member 44. The bulbous inner member 44 is wrapped in the free end of strap 42 as shown in FIG. 8. The strap 42 is then stitched together to hold the bulbous inner member 44 in place. Straps 42 are sewn or otherwise attached to body member 11 at edges 41 and 43 of roof section 14 so that bulbous members 44 contained within hang down between any of the doorjambs and doors 80, 81, 82 and 83 in their open position. For illustrative purposes, however, theft guard tabs 13 have only been shown inserted between the doorjambs and front doors 80 and 82. When doors 80 and 82 are closed, the bulbous inner members 44 cannot be pulled out of vehicle 60 between doors 80 and 82 and the doorjambs.

Thus, when theft guard tabs 13 are inserted into vehicle 60 as described, and doors 80 and 82 are closed and locked, the easy theft of vehicle cover 10 is prevented. Such theft prevention is accomplished without employing additional locks and keys other than standard equipment with vehicle 60. In addition, theft guard tabs 13 also act to anchor cover 10 to vehicle 60.

While there have been shown and described preferred embodiments in accordance with the invention, it will be appreciated that many changes and modifications may be made therein without departing from the spirit of the invention.

What is claimed is:

1. In a vehicle cover having a body member for forming a skin over a vehicle excepting at least one door thereof, said skin defining openings for a radiator grill and a pair of headlights of the vehicle, said skin also including means for exposing a portion of a windshield of the vehicle; said vehicle cover further comprising means including bendable, shape retaining tabs for selectively anchoring said vehicle cover to the vehicle and means for preventing said vehicle cover from being easily removed.

2. The vehicle cover of claim 1 wherein said preventing means comprise a plurality of tabs, each tab having an elongated strap and an enlarged member disposed at one end of said strap.

3. A cover for protecting a vehicle including the hood, roof and trunk thereof, said cover comprising:
   a hood section configured to cover the hood, said hood section having means for exposing a portion of a front windshield of the vehicle;
   a roof section contiguous with said hood section configured to cover the roof;
   a trunk section contiguous with said roof section configured to cover the trunk;
   anchoring means including bendable, shape retaining tabs disposed on said hood and trunk sections for fastening said cover to the vehicle; and
   locking means disposed on said roof section for preventing said cover from being easily removed from the vehicle.

4. The vehicle cover of claim 3 wherein said locking means comprises a plurality of tabs, each tab having an elongated strap and an enlarged member disposed at one end of said strap.

5. The vehicle cover of claim 3 or 4 wherein said trunk section has a flap for selectively exposing a portion of a rear windshield of the vehicle.

6. A cover for protecting portions of a vehicle comprising:
   a front portion configured to fit over and around the front of the vehicle, said front portion defining openings for a radiator grill and at least one headlight of the vehicle;
   a rear portion configured to fit over and around the rear of the vehicle;
   a roof portion contiguous with said front and rear portions, wherein said front, rear and roof portions are configured such that the cover does not extend over the vehicle doors;
   at least one flap in said cover for selectively exposing a portion of a windshield of the vehicle;
   means for selectively securing said flap to said cover when the windshield is exposed;
   anchoring means disposed on said front and rear portions for fastening said cover on the vehicle; and locking means disposed on said roof portion for preventing said cover from being easily removed.

7. The vehicle cover of claim 6 wherein said locking means comprise a plurality of tabs, each tab having an elongated strap and an enlarged member disposed at one end of said strap.

8. The vehicle cover of claim 7 wherein said rear portion defines an opening for at least one taillight of the vehicle.

9. A cover for protecting portions of a vehicle comprising:
 a front portion configured to fit over and around the front of the vehicle, said front portion defining an opening for a radiator grill and having at least one transparent panel corresponding to a headlight of the vehicle;
 a rear portion configured to fit over and around the rear of said vehicle, said rear portion having at least one transparent panel corresponding to a taillight of the vehicle;
 a roof portion contiguous with said front and rear portions, wherein said front, rear and roof portions are configured such that the cover does not generally extend over the vehicle doors;
 at least one transparent panel in said roof portion for selectively exposing a portion of a windshield of the vehicle;
 anchoring means disposed on said front and rear portions for fastening said cover on the vehicle; and
 locking means disposed on said roof portion for preventing said cover from being easily removed.

10. The vehicle cover of claim 6 wherein said anchoring means comprises bendable, shape retaining tabs secured to said front and rear portions for attachment of said portions at wheel wells of the vehicle.

11. The vehicle cover of claim 9 wherein said anchoring means comprises bendable, shape retaining tabs secured to said front and rear portions for attachment of said portions at wheel wells of the vehicle.

12. The vehicle cover of claim 2 wherein said tabs of said means for anchoring are located to be bent around edges of the vehicle body and said cover forms a skin over at least substantial portions of the fenders and quarter panels of the vehicle.

* * * * *